United States Patent
Huperz

(10) Patent No.: US 7,357,414 B2
(45) Date of Patent: Apr. 15, 2008

(54) CLOSURE FOR A GAS SUPPLY SYSTEM

(75) Inventor: Ulrich Huperz, Attendorn (DE)

(73) Assignee: Huperz Automotive Systems GmbH & Co. KG (DE)

( * ) Notice: Subject to any disclaimer, the term of this patent is extended or adjusted under 35 U.S.C. 154(b) by 107 days.

(21) Appl. No.: 10/501,034

(22) PCT Filed: Jan. 13, 2003

(86) PCT No.: PCT/EP03/00219

§ 371 (c)(1),
(2), (4) Date: Jul. 8, 2004

(87) PCT Pub. No.: WO03/057386

PCT Pub. Date: Jul. 17, 2003

(65) Prior Publication Data

US 2005/0017489 A1    Jan. 27, 2005

(30) Foreign Application Priority Data

Jan. 11, 2002    (DE)    ................. 102 01 002

(51) Int. Cl.
*B60R 21/16* (2006.01)

(52) U.S. Cl. ........................ 280/740; 29/421.1; 29/514; 228/124.6; 228/245; 228/246; 280/728.2; 280/730.2; 280/749

(58) Field of Classification Search ............ 280/740, 280/728.1, 728.2, 736, 741, 742, 730.2, 749; 29/421.1, 514; 228/124.6, 245, 246
See application file for complete search history.

(56) References Cited

U.S. PATENT DOCUMENTS

| 2,313,068 A | 3/1943 | Heineman |
| 2,776,473 A | 1/1957 | Dailey et al. |
| 4,008,821 A | 2/1977 | Thompson et al. |

FOREIGN PATENT DOCUMENTS

| DE | 31 36 608 A1 | 3/1983 |
| DE | 32 31 493 A1 | 3/1984 |
| DE | 38 02 807 A1 | 8/1989 |
| DE | 195 05 076 A1 | 9/1996 |
| DE | 196 00 843 A1 | 1/1997 |
| DE | 198 02 993 C2 | 8/1999 |
| DE | 198 34 690 A1 | 2/2000 |
| DE | 299 16 526 U1 | 3/2000 |

(Continued)

OTHER PUBLICATIONS

Random House College Dictionary, c. 1980, p. 37.*

*Primary Examiner*—Eric Culbreth
(74) *Attorney, Agent, or Firm*—Bachman & LaPointe, P.C.

(57) ABSTRACT

A seal for a gas supply system of metal, in particular for sealing an airbag conduit, wherein, during operation, the gas supply system has a gas-conducting cross-section and a wall of metal, wherein in the area which seals the cross-section of the gas supply system, a layer of a plastically deformable material is at least partially inserted and the area with the plastically deformable material present therein is sealed in a gas-tight manner, wherein the area of the seal and the plastically deformable material present therein are mechanically interlaced one with the other.

21 Claims, 3 Drawing Sheets

FOREIGN PATENT DOCUMENTS

| | | |
|---|---|---|
| DE | 100 22 462 A1 | 11/2000 |
| DE | 101 33 086 C1 | 1/2003 |
| EP | 0 353 982 A2 | 2/1990 |
| JP | 57064427 A | 4/1982 |
| JP | 59107730 A | 6/1984 |
| WO | WO 01/24955 A1 | 4/2001 |

* cited by examiner

CLOSURE FOR A GAS SUPPLY SYSTEM

BACKGROUND OF THE INVENTION

The present invention relates to a gas-tight seal for a gas supply system of metal, in particular for sealing an airbag gas supply system, and to a method of manufacturing a gas-tight seal.

Airbag systems are increasingly used in motor vehicles. They have come to be used at different positions in the vehicle in order to absorb lateral as well as frontal collisions. These airbag systems are partially equipped with gas conducting conduits of metal. The dimensions and the material of the walls of these conduits are such that the gas supply system is sufficiently gas tight so as to withstand the high pressures occurring when the airbag is triggered. The ends of the conduits are fixed to the vehicle if necessary in order to securely fasten the airbag system.

The gas-tight seal of these gas supply systems must have an endurance of 5 seconds in accidents involving roll-overs of the vehicle. After this, the pressure is reduced in order to release the passengers out of the vehicle. Hitherto, in some approaches the seal has been a plastic stopper which was inserted into the open end of the gas supply system and which then had to be connected, usually crimped, to the conduit in a gas-tight manner. This approach involved a lot of material because, in order to achieve sufficient gas tightness, the stopper had to reach sufficiently deep into the gas supply system and the tightness of the connection required elaborate fastening.

According to DE 100 22 462 it is suggested that an end cap, which is of the same material as the conduit itself, be welded onto the end of the conduit, preferably using laser welding, electron welding or arc welding techniques. These welding techniques are expensive and require high precision.

JP 57064427 A describes the insertion of an elastic layer of aluminium, copper and rubber into the end of a tube and the subsequent compression of the tube end under controlled pressure. The compression is carried out against a template in order to ensure correct forming. After closing the tube end, the template must be removed from the free end of the tube, and if necessary a further coupling piece of the tube is joined. The process is complex and, with the use of the template, is economically feasible only in a few cases.

SUMMARY OF THE INVENTION

It is an object of the present invention to provide a gas-tight seal which is simple to manufacture and safe, and to suggest a method by which such a gas-tight seal can be provided for a gas supply system of metal.

This object has been achieved with the seal for a gas supply system of metal as described herein and the method of manufacturing this seal according to the present invention and by the use of soldering alloys of the present invention.

The insertion of a layer of a plastically deformable material in the area to be sealed of the gas supply system enables simple and safe sealing when the walls are joined in the area of the gas supply system which is to be sealed in a gas-tight manner. The metal of the wall of the gas supply system and the layer of plastically deformable material lie flat against each other in a gas-tight manner after sealing and form a seal for the gas supply system fulfilling the above-mentioned requirements with respect to safety and tightness.

Any plastically deformable material is suitable for the creation of the seal, which is durably pressure tight. A particularly preferred group of materials is comprised of metals and metal-organic compounds. However, natural or synthetic polymers are also well suited, as long as they have the required resistance to ageing and as long as a pressure-tight seal is possible with the wall of the gas supply system. Adhesives, laminates of metals and fibres or silicone compounds, for example, are suitable for the manufacture of gas-tight seals of gas supply systems. Natural and synthetic fibre materials are, of course, also suitable, as long as they are gas resistant and resistant to ageing. These properties of the plastically deformable materials can be derived from well-known product documentation or can be established by a few simple experiments. Also combinations of at least two of the previously mentioned plastically deformable materials are suitable to provide a gas-tight seal of a gas supply system. For example, fibre-reinforced plastics or metal-organic soldering alloys may be used.

The layer of plastically deformable material is preferably formed as a film of metal or a metallic or metal-organic soldering alloy. Whenever a layer of metal is described in the following, the respective explanations also include a layer of a different ductile material.

The layer of a ductile material is inserted in the area to be sealed in the open gas supply system and extends over a certain distance, usually between 1 and 30 mm, preferably between 5 and 20 mm, into the conduit. It has a thickness of between 0.05 and 5 mm, preferably between 0.2 and 2 mm. This layer of ductile material extends preferably over the maximum cross-section enclosed by the wall of the gas supply system. It may, however, be sufficient to insert a somewhat more narrow layer into the cross-section, for example if the end areas of the wall of the gas supply system have a sufficient thickness and form a sufficiently strong bond with each other when they and the layer of ductile material are compressed.

A gas-tight seal is formed by mechanical compression of the wall of the gas supply system and the layer of ductile material arranged within it. The wall and the ductile material have to lie flat closely against each other in order to provide sufficient gas-tightness. It must be ensured that a sudden pressure differential must be absorbed safely by this seal, i.e. without pressure losses, for at least 5 seconds. The sealing is usually assisted, in particular when polymers of fibre materials or combinations thereof are used, by producing an interlacing between the wall and the ductile material during compression. This ensures better gas-tightness and enables the dimensions of the seal to be kept as small as possible. The interlacing may be realized by having sections of the wall intrude into the plastically deformable material, or in a different way. The sealing of the gas supply system and therefore the creation of the seal can be carried out without the need of a template or another foreign body in the gas supply system.

Alternatively, the area in which the wall and the plastically deformable material lie flat against each other, is heated to create a gas-tight bond. If, for example, a metal layer is used consisting of a meltable alloy, preferably a copper alloy in particular, it is immaterial as such at which temperature the metal layer becomes plastically deformable since this metal layer only has to be heated over a short period of time to provide the desired gas-tight joint with the wall of the gas supply system. It is, however, especially preferred for this temperature not to exceed the melting-point of the metal of which the gas supply system is made.

The gas-tight seal of a gas supply system according to the present invention has a wall of metal and a layer of metal which is bonded to the metal of the wall in a gas-tight manner by heating the metal layer, preferably by means of a soldering method, after the wall and the metal layer have been pressed one onto the other.

The method according to the present invention of manufacturing the seal of the metal gas supply system is explained in the following. Initially, a layer of a plastically deformable material is placed in the area of the gas supply system to be sealed. This layer is preferably in the form of a strip. The wall of the gas supply system is then mechanically deformed until the wall lies flat against the layer of plastically deformable material. This mechanical seal is, however, not yet sufficiently gas-tight.

In order to safely achieve the required gas-tightness, preferably either a mechanical interlacing of the wall with the layer of plastically deformable material is carried out, or the layer of the inserted material is at least partially heated. The layer of metal is, for example, heated until it reaches plastic deformability, and a gas-tight bond with the metal wall is formed due to the deformation or flowing of the metal layer. This bond is simple and safe to achieve and is resistant to ageing.

According to a preferred embodiment of the method of the present invention, the wall and the layer of plastically deformable material is mechanically interlaced one with the other when the wall is compressed.

This ensures good gas tightness, especially when plastically deformable materials, such as rubber, silicone or other natural or synthetic polymer materials are used. When metals are processed, the interlacing is usually carried out in a separate step.

Heating the layer of metal may be done principally in such a way that both materials are heated. Preferably, however, it is limited to the metal layer. Such selective heating is possible, for example, with the use of induction or resistance heating. The heating which is necessary, for example, to achieve setting of a two-component adhesive, is noticeably less than that necessary to reach soldering temperatures.

In order to fulfil the stringent requirements as to product safety, according to another preferred embodiment of the method of the present invention, mechanical pressure is exerted on the area in which the metal layer is inserted, while or immediately after this area has been at least partially heated. This ensures complete and durable bonding of metal on metal.

It has been found that common soldering alloys are excellent for this purpose. They are cheap and available in the required dimensions and as ready-to-use products. Copper alloys have been found to be highly suitable.

The seal of the gas supply system is often formed as a flat crimp and is often used to fasten the gas supply systems to the vehicle. Since the seal of the present invention is sealed in a flat configuration, it is quite simple to add lugs or other openings to attach the gas supply systems in or on the seal.

BRIEF DESCRIPTION OF THE DRAWINGS

An exemplary embodiment of the present invention will be explained in detail with reference to the drawings, in which.

DETAILED DESCRIPTION

Figure 1:
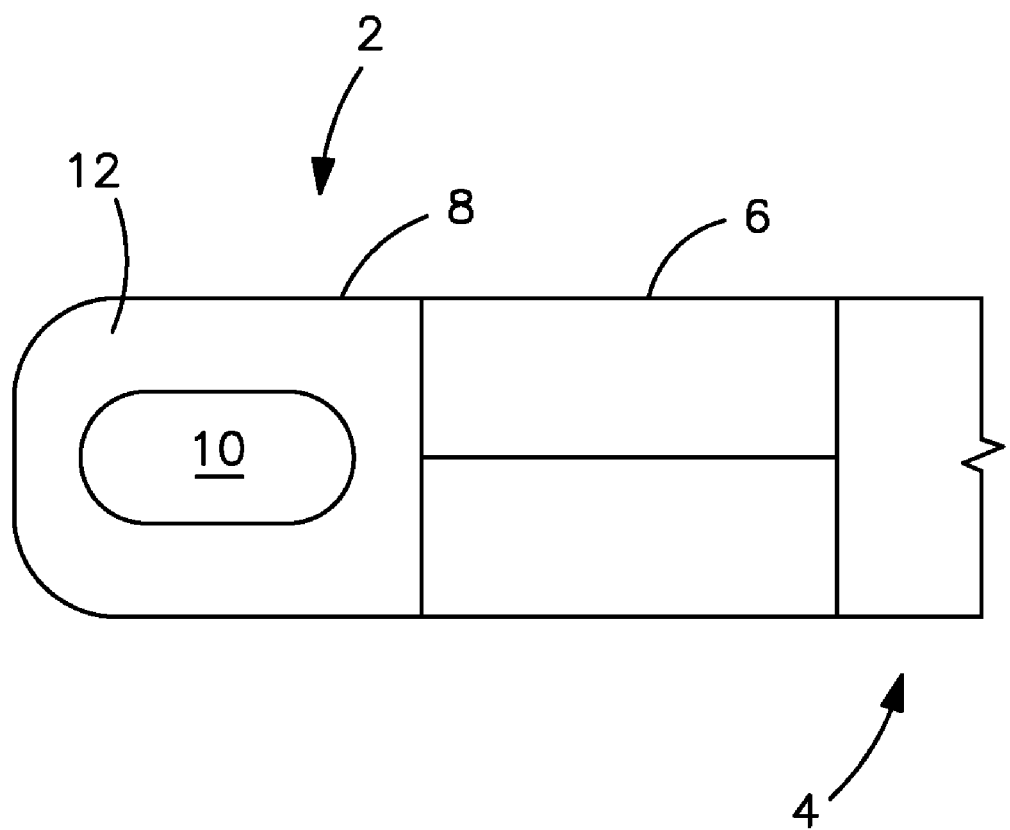
FIG. 1 is a plan view of the seal of a gas supply system of metal for an airbag system.

FIG. 1 shows an end piece 2 of a gas supply system of metal for an airbag system. The gas supply system 4 opens into an intermediate piece 6 having a tapering cross-section and ending in seal 8 of gas supply system 4. In contrast to the round cross-section of gas supply system 4 and to the tapering intermediate piece 6, seal 8 is flat. It does not have a cavity.

An eye 10 is integrated in seal 8 serving to fasten the gas supply system to a vehicle in which the airbag system is mounted.

Figure 2:
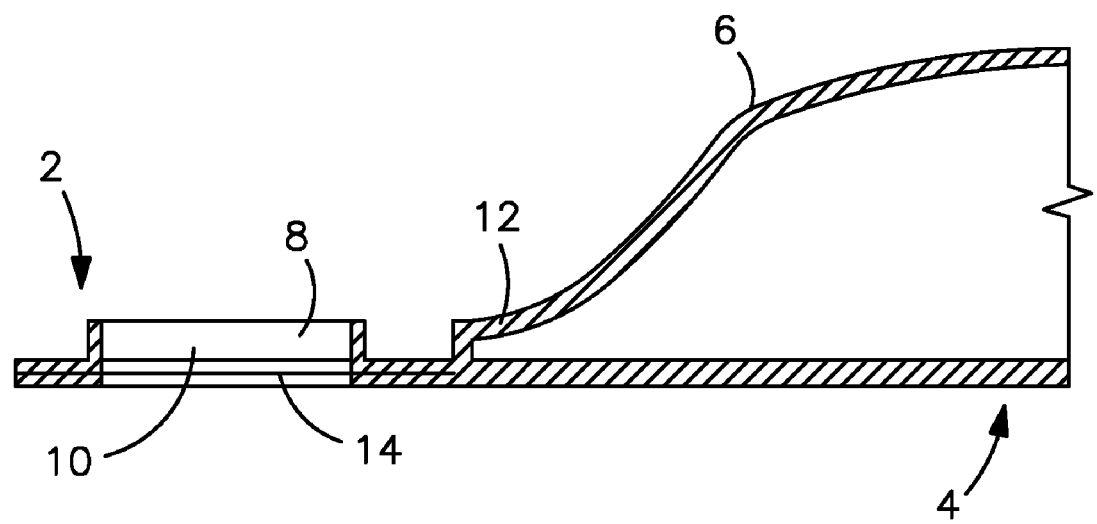
FIG. 2 is a sectional view of the seal of a gas supply system of metal for an airbag system of FIG. 1.

FIG. 2 shows the same end piece 2 of the gas supply system of metal. Wall 12 encloses both the gas supply system 4 and the integrally formed tapering intermediate piece 6 and seal 8 of the end piece. In seal 8, a band or layer 14 of a strip-shaped film of copper solder alloy with a material thickness of about 0.3 mm is placed. The desired gas-tight seal of the gas supply system is provided in that at first the strip-shaped band 14 of copper solder alloy is placed in the area of seal 8 of the gas supply system. The metal of wall 12 in a state of plastic deformability is then formed in the area of the intermediate piece and the seal in such a way that wall 12 lies flat against band 14 of copper solder alloy at seal 8 of the gas supply system.

Band 14 is then heated in a non-contact manner using an induction or resistive method until it is plastically deformable. The metal of wall 12 and band or layer 14 is bonded in a gas-tight manner by the mechanical pressure of a forming tool. After cooling, the gas supply system is sealed in a gas-tight manner by the seal. The cooling does not change the tightness of the bond. The material for eye 10 is taken out of seal 8.

Figure 3:
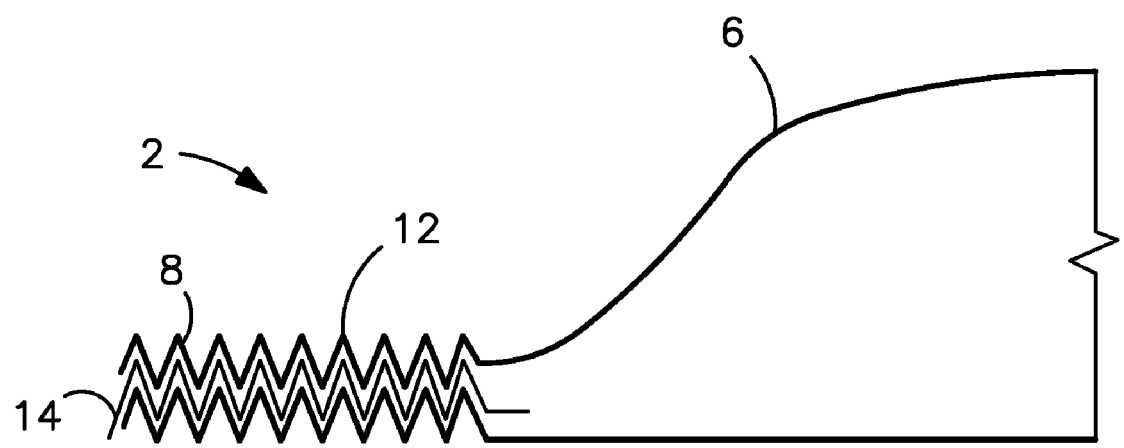
FIG. 3 is a schematic representation of interlacing in the seal of the present invention.

According to a further exemplary embodiment, a strip-shaped band of gas and ageing-resistant silicone is inserted in an area of a gas supply system of metal, the wall of which is then compressed by the application of pressure. The pressure die(s) applying pressure to the wall have a profiled surface. During compression of the wall, the metal of the wall is indented into the band of silicone in those places of the die(s) that are raised. The result is a mechanical interlacing as schematically illustrated in FIG. 3. The seal of the gas supply system is now pressure-tight. No template is necessary to make the seal which is inserted into the gas supply system. This is why the seal can be formed directly on the end of a long conduit since after pressure application no further finishing processes are needed.

According to a third exemplary embodiment, a strip-shaped band of a polyurethane based two-component adhesive is inserted into an end of a gas supply system of metal. The wall of the gas supply system is mechanically compressed in the area where the band has been inserted. After the wall lies flat against the band of the two-component adhesive, this area of the gas supply system is heated so that the adhesive sets and the result is a gas-tight and ageing-resistant bond. For particularly difficult applications a provision can be made that when the wall is compressed a mechanical interlacing is also indented.

The invention claimed is:

1. A seal for a gas supply system wherein the gas supply system has an open, gas-conducting cross-section defined by a wall of metal, and a seal defined by a flattened portion of the gas supply system and a layer of a plastically deformable material between sides of the flattened portion sealed in a gas-tight manner, and wherein, in an area of the seal, the sides and the layer are mechanically interlaced one with the other.

2. The seal of claim 1, characterized in that said layer of plastically deformable material fills an entire cross-section enclosed by said wall of metal.

3. The seal of claim 1, characterized in that said layer of plastically deformable material is of a meltable alloy.

4. The seal of claim 1, characterized in that said layer of plastically deformable material becomes plastically deformable at a temperature not exceeding the melting-point of the metal of the gas supply system.

5. The seal of claim 1, characterized in that said layer of plastically deformable material has a thickness of about 0.05 to 5 mm.

6. The seal of claim 1, wherein the plastically deformable material is a solder alloy.

7. The seal of claim 1, wherein said plastically deformable material is selected from the group consisting of metal, metal-organic compounds, metallic or metal-organic alloys, natural or synthetic polymers, adhesives, natural or synthetic fibre materials, and combinations thereof.

8. The seal of claim 7, characterized in that said layer of plastically deformable material is of metal.

9. The seal of claim 7, characterized in that said layer of plastically deformable material is of a natural or synthetic plastic which, after insertion and during or directly with gas-tight bonding of the plastically deformable material with the metal of the gas supply system, expands towards the wall of the gas supply system.

10. The seal of claim 7, characterized in that said layer of plastically deformable material is a natural or a synthetic adhesive forming an adhesive bond with the wall during or after the gas-tight bonding of the adhesive with the wall of the gas supply system.

11. The seal of claim 7, characterized in that said layer of plastically deformable material is shaped as a film.

12. A method of manufacturing a seal for a gas supply system of metal, comprising the steps of:

inserting a layer of a plastically deformable material in an area to be sealed of the gas supply system of metal, mechanically deforming a wall of the gas supply system until the wall of the gas supply system and said layer lie flat against each other, and gas-tight sealing of said seal by a mechanical interlacing of said wall with said layer.

13. The method of claim 12, characterized in that said layer is heated until the material is plastically deformable and a gas-tight bond between the wall of the gas supply system and said layer has been formed.

14. The method of claim 12, characterized in that an area into which said layer is inserted is at least partially heated and a mechanical pressure is exerted in this area.

15. The method of claim 12, characterized in that said layer of metal is heated by induction or resistance techniques.

16. The method of claim 12, characterized in that said layer of metal is of a solder material.

17. The method of claim 16, characterized in that said solder material is copper-based.

18. The method of claim 12, wherein said plastically deformable material is selected from the group consisting of natural or synthetic polymers, adhesive, natural or synthetic fibre materials, paper and combinations thereof.

19. The method of claim 12, characterized in that said layer of a plastically deformable material is a strip-shaped layer.

20. The method of claim 12, wherein the plastically deformable material is a solder alloy.

21. The method of claim 12, wherein the mechanical deforming step also deforms the layer.

* * * * *